(12) United States Patent
Zhang

(10) Patent No.: US 11,160,429 B2
(45) Date of Patent: Nov. 2, 2021

(54) SWIVEL JOINT FOR HAND-HELD VACUUM CLEANER AND HAND-HELD VACUUM CLEANER

(71) Applicant: Suzhou Aijian Electric Appliance Co., Ltd., Jiangsu (CN)

(72) Inventor: Yuqi Zhang, Jiangsu (CN)

(73) Assignee: Suzhou Aijian Electric Appliance Co., Ltd., Jiangsu (CN)

(*) Notice: Subject to any disclaimer, the term of this patent is extended or adjusted under 35 U.S.C. 154(b) by 506 days.

(21) Appl. No.: 16/080,015

(22) PCT Filed: Oct. 20, 2016

(86) PCT No.: PCT/CN2016/102678
§ 371 (c)(1),
(2) Date: Aug. 27, 2018

(87) PCT Pub. No.: WO2017/143791
PCT Pub. Date: Aug. 31, 2017

(65) Prior Publication Data
US 2019/0059672 A1 Feb. 28, 2019

(30) Foreign Application Priority Data
Feb. 26, 2016 (CN) .......................... 201610104952.7

(51) Int. Cl.
*F16L 27/08* (2006.01)
*A47L 9/24* (2006.01)
(Continued)

(52) U.S. Cl.
CPC .............. *A47L 9/244* (2013.01); *A47L 5/225* (2013.01); *A47L 5/24* (2013.01); *A47L 9/246* (2013.01); *F16L 27/08* (2013.01)

(58) Field of Classification Search
CPC . F16L 25/01; F16L 27/08; F16L 27/02; F16L 27/023; F16L 31/00; A47L 9/244; A47L 9/246; A47L 9/242; A47L 9/248
(Continued)

(56) References Cited

U.S. PATENT DOCUMENTS 3,928,715 A * 12/1975 Holden .................. H01B 17/58
174/47
3,965,526 A * 6/1976 Doubleday ............. A47L 9/246
15/377

(Continued)

FOREIGN PATENT DOCUMENTS

CN 101491423 7/2009
CN 102440717 5/2012
(Continued)

*Primary Examiner* — Aaron M Dunwoody
(74) *Attorney, Agent, or Firm* — JCIPRNET

(57) ABSTRACT

A swivel joint for a hand-held vacuum cleaner includes a first joint tube and a second joint tube rotatably connected at one end portions thereof with respect to each other, a connecting tube enabling communication between the first joint tube with the second joint tube, and a conductive assembly. The connecting tube is a corrugated flexible tube. The other end portions of the first and second joint tubes respectively connect a vacuum cleaner body with a dust suction tube of a vacuum cleaner or the dust suction tube with a dust suction head of the vacuum cleaner. The conductive assembly includes a first conductive interface and a second conductive interface respectively disposed on the first and second joint tubes and a conducting wire disposed inside the corrugated flexible tube. Two ends of the conducting wire connect with the first and second conductive interfaces, respectively.

12 Claims, 4 Drawing Sheets

(51) Int. Cl.
*A47L 5/24* (2006.01)
*A47L 5/22* (2006.01)

(58) Field of Classification Search
USPC ............................................ 285/7, 184, 223
See application file for complete search history.

(56) References Cited

U.S. PATENT DOCUMENTS

| | | | |
|---|---|---|---|
| 4,188,081 A | | 2/1980 | Holden |
| 5,007,839 A | | 4/1991 | Holden et al. |
| 2014/0237755 A1 | * | 8/2014 | Conrad ................... A47L 5/225 15/329 |

FOREIGN PATENT DOCUMENTS

| | | |
|---|---|---|
| CN | 102485155 | 6/2012 |
| CN | 102715871 | 10/2012 |
| CN | 102727139 | 10/2012 |
| CN | 202681839 | 1/2013 |
| CN | 202723762 | 2/2013 |
| CN | 203468509 | 3/2014 |
| CN | 204071956 | 1/2015 |
| CN | 204379164 | 6/2015 |
| CN | 105581780 | 5/2016 |
| CN | 105877611 | 8/2016 |
| CN | 205433571 | 8/2016 |
| CN | 205548452 | 9/2016 |
| EP | 1764021 | 3/2007 |
| GB | 2409803 | 7/2005 |
| GB | 2466290 | 6/2010 |
| GB | 2513561 | 11/2014 |
| JP | 2005176874 | 7/2005 |
| JP | 2013070839 | 4/2013 |
| KR | 20030033774 | 5/2003 |

\* cited by examiner

SWIVEL JOINT FOR HAND-HELD VACUUM CLEANER AND HAND-HELD VACUUM CLEANER

CROSS-REFERENCE TO RELATED APPLICATION

This application is a 371 application of the international PCT application serial no. PCT/CN2016/102678, filed on Oct. 20, 2016, which claims the priority benefit of China application no. 201610104952.7, filed on Feb. 26, 2016. The entirety of each of the above-mentioned patent applications is hereby incorporated by reference herein and made a part of this specification.

TECHNICAL FIELD OF THE INVENTION

The present disclosure relates to a swivel joint for a hand-held vacuum cleaner, and meanwhile to a hand-held vacuum cleaner with the swivel joint.

BACKGROUND OF THE INVENTION

As is well known, a hand-held vacuum cleaner comprises a main vacuum cleaner body, a dust suction head (brush), a dust suction tube connecting the dust suction head and the main vacuum cleaner body, and an electrically-conductive assembly for connecting circuits of the main vacuum cleaner body and the dust suction head, wherein the dust suction tube is further provided with an electrically-conductive component therein, and under the control of the main vacuum cleaner body, the electric power is directed to the dust suction head through the electrically-conductive component, so that the dust suction head is able to work.

However, with the continuous improvement of life, the furnishings in the house are gradually increasing, and therefore, the cleaning work of the house is also very inconvenient and therefore, the hand-held vacuum cleaners appear to be very practical, but, present hand-held vacuum cleaners generally have the following drawbacks:

1), The hand-held vacuum cleaner can not be placed quickly and uprightly, and the hand-held vacuum cleaners appearing on the market are basically firstly disassembled and then placed;

2) It is not possible to quickly and conveniently achieve multi-angle (omni-directional) dust removal, for example, the dust removal work on the floor under a bottom of a bench or a cabinet usually requires a person to squat or grovel to insert the dust suction head into the bottom of the bench or the cabinet, resulting in the cleaning work is very exhausting.

SUMMARY OF THE INVENTION

The technical problems to be solved by the present disclosure is to overcome the shortcomings of the prior art, and to provide a swivel joint for a hand-held vacuum cleaner.

And meanwhile, the present disclosure further provides an improved hand-held vacuum cleaner.

To solve the above problems, the present disclosure employs the following technical solution:

A swivel joint for a hand-held vacuum cleaner comprises a first joint tube and a second joint tube rotatably connected at one end portions thereof with respect to each other, a connecting tube enabling communication between the first joint tube with the second joint tube which are rotatably connected with respect to each other, and a conductive assembly respectively located within the first joint tube and the second joint and connected with each other, wherein the connecting tube is a corrugated flexible tube, the other end portions of the first joint tube and the second joint tube respectively connect a vacuum cleaner body with a dust suction tube of a vacuum cleaner or a dust suction tube with a dust suction head of the vacuum cleaner, and the conductive assembly comprise a first conductive interface and a second conductive interface respectively disposed on the first joint tube and the second joint tube, and a conducting wire disposed inside the corrugated flexible tube along corrugation of the corrugated flexible tube, wherein two ends of the conducting wire connect with the first conductive interface and the second conductive interface, respectively.

Preferably, the first joint tube is rotatably disposed on the second joint tube via rotating shafts disposed at two sides.

Preferably, a rotation angel between the first joint tube and the second joint tube is 0-90°. The rotation angel refers to an angle formed by a center line of the first joint tube and a center line of the second joint tube, and along with the relative rotation of the first joint tube and the second joint tube, this rotation angle varies as well, within a variation range of 0-90°. The hand-held vacuum cleaner may stand in a right-angle pose.

Further, the first joint tube and the second joint tube both are provided with a first position-limiting part and a second position-limiting part, respectively, two first position-limiting parts tightly contact when the angle between the first joint tube and the second joint tube is 0°; and two second position-limiting parts tightly contact when the angle between the first joint tube and the second joint tube is 90°.

According to a specific implementation and a preferred aspect of the present invention, two sides of the second joint tube are respectively provided with axles vertically extending to an extension direction of the second joint tube, and the swivel joint further comprises rolling wheels rotatably disposed on the axles around axle lines of the axles, wherein lower portions of the rolling wheels protrude from (i.e., is lower than) a bottom of the second joint tube, so as to provide the swivel joint in a rolling manner.

Further, the rolling wheels extend outwards from a side close to the second joint tube, and are in a circular truncated cone with a gradually reduced external diameter. The volume is reduced maximally, and the overall appearance is also beautified.

Preferably, the other end portions of the first joint tube and the second joint tube are capable of being locked with respect to each other.

According to a specific implementation and a preferred aspect of the present invention, the first conductive interface and the second conductive interface are a contact pin and a socket cooperating with each other, respectively.

Preferably, the conducting wire and the corrugated flexible tube are integrally formed.

Another technical solution of the present invention is: a hand-held vacuum cleaner, comprising a vacuum cleaner body, a dust suction tube, a dust suction head, and the above-mentioned swivel joint, the swivel joint respectively connects the vacuum cleaner body with the dust suction tube or the dust suction tube with the dust suction head, the dust suction tube can be configured telescopically and there is one dust suction tube or are two dust suction tubes end-to-end jointed, wherein the swivel joints connect the vacuum cleaner body with the dust suction tube and the dust suction tube with the dust suction head, respectively, when there is one dust suction tube; and the swivel joints connect the two end-to-end jointed dust suction tubes together and the dust suction tubes with the dust suction head, respectively, when there are two dust suction tubes end-to-end jointed.

Due to the implementation of the above technical solutions, the present disclosure has the following advantages over the prior art:

In the present disclosure, the provision of the swivel joint enables a hand-held vacuum cleaner to be quickly placed in an upright position, allows an operator to perform multi-angle (omni-directional) dust removal with a natural posture, with much convenience, and moreover, the design of a hidden electrically-conductive assembly can reduce the probability of occurrence of a line fault and extend the service life, with a simple structure and a low cost at the same time.

BRIEF DESCRIPTION OF THE DRAWINGS

In the following, the present disclosure is further explained in detail combining with the accompanying drawings and specific embodiments.

wherein: 1—vacuum cleaner body; 2—dust suction head; 3—dust suction tube; 4—swivel joint; 41—first joint tube; 42—second joint tube; 43—connecting tube; 44—conductive assembly; 441—first conductive interface; 442—second conductive interface; 443—conducting wire; 45—rolling wheel; a—rotating shaft; b—first position-limiting part; c—second position-limiting part; d—axle.

DETAILED DESCRIPTION OF EXEMPLARY EMBODIMENTS

Figure 1:
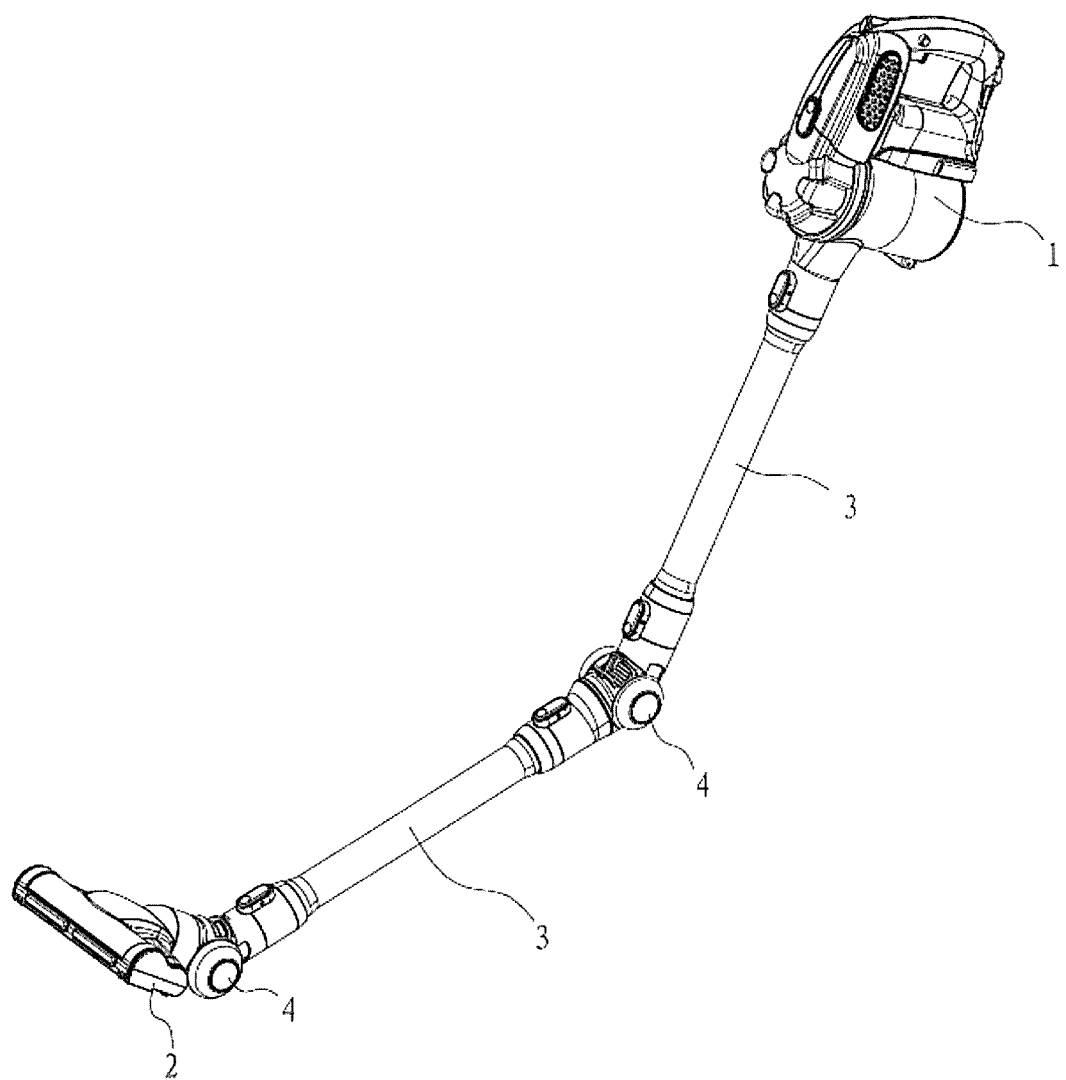
FIG. 1 is a schematic structure stereogram of a hand-held vacuum cleaner according to the present disclosure (with two dust suction tubes)
Figure 2:
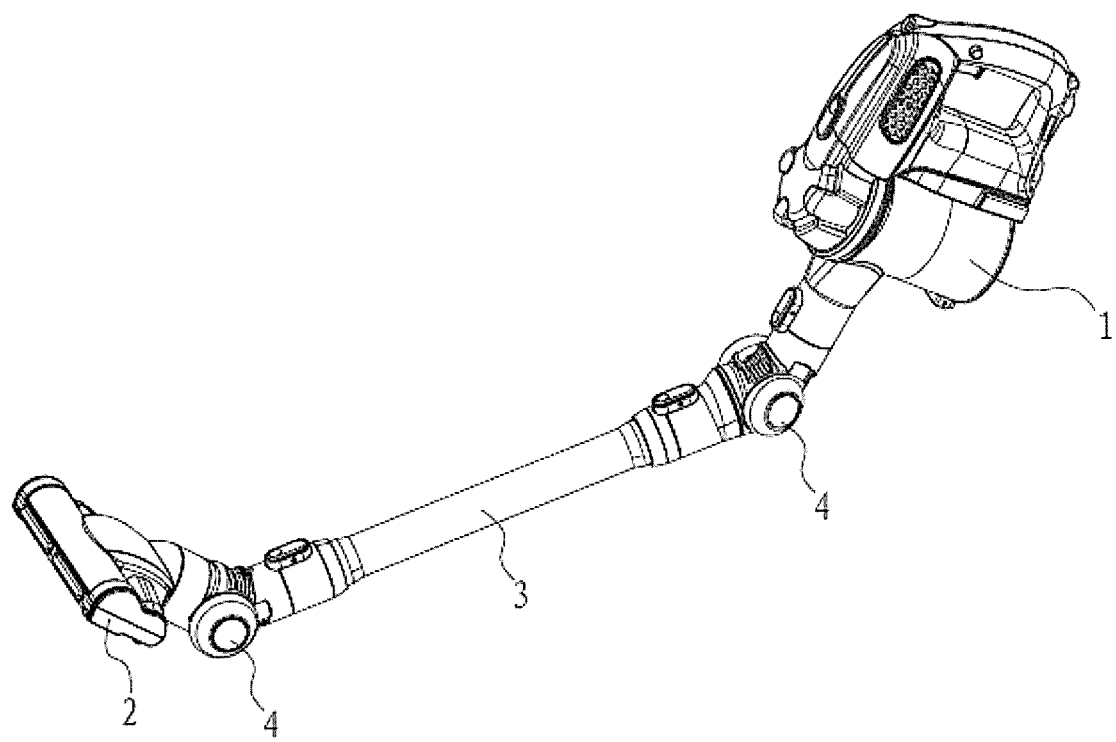
FIG. 2 is a schematic structure stereogram of a hand-held vacuum cleaner according to the present disclosure (with one dust suction tube)
Figure 3:
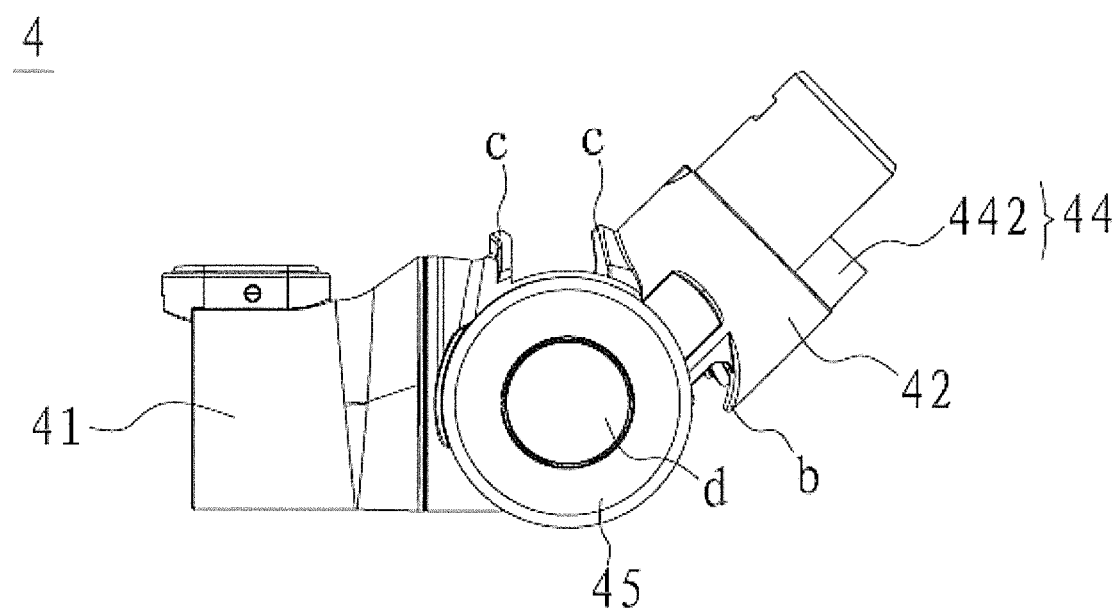
FIG. 3 is a schematic front view of a swivel joint according to the present disclosure.
Figure 4:
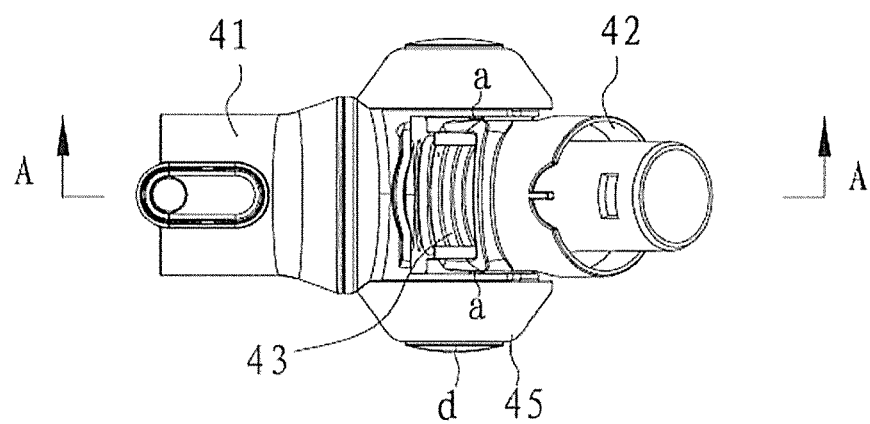
FIG. 4 is a schematic top view of FIG. 3.
Figure 5:
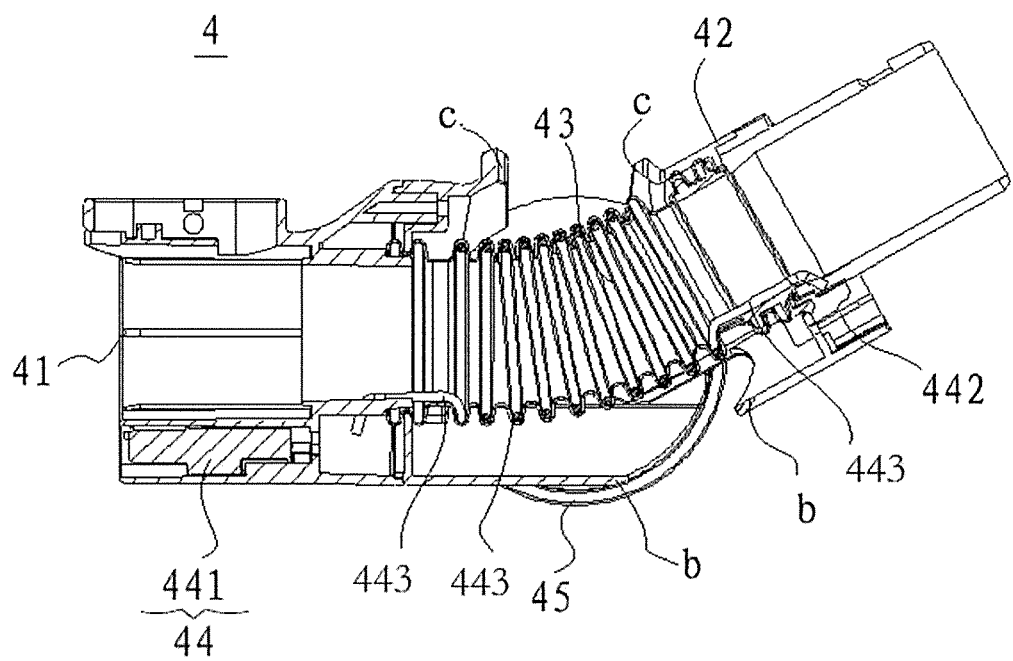
FIG. 5 is a schematic sectional view of Line A-A in FIG. 4.
Figure 6:
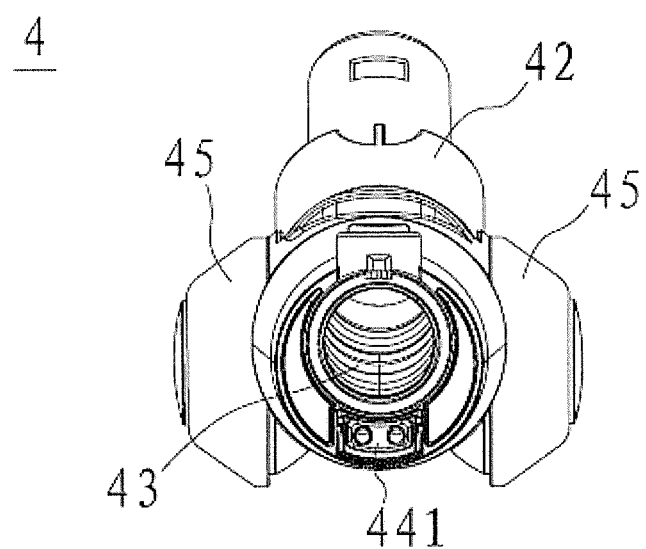
FIG. 6 is a schematic left view of FIG. 3.

As shown in FIG. 1 to FIG. 6, a hand-held vacuum cleaner provided by the present embodiment, comprises a vacuum cleaner body 1, a dust suction head 2, a dust suction tube 3, and a swivel joint 4, wherein the swivel joint 4 connects the vacuum cleaner body 1 with the dust suction tube 3 or the dust suction tube 3 with the dust suction head 2, respectively.

The dust suction tube 3 can be configured telescopically, and there is one dust suction tube or there are two dust suction tubes end-to-end jointed, wherein the swivel joints 4 connect the vacuum cleaner body 1 with the dust suction tube 3 and the dust suction tube 3 with the dust suction head 2, respectively, when there is one dust suction tube 3; and the swivel joints 4 connect the two end-to-end jointed dust suction tubes 3 together and the dust suction tubes 3 with the dust suction head 2, respectively, when there are two dust suction tubes 3 end-to-end jointed.

Employing two telescopic and end-to-end jointed dust suction tubes 3 is an optimal implementation, and in the practical operation, it also may utilize two ordinary and end-to-end jointed dust suction tubes.

In particular, the swivel joint 4 comprises a first joint tube 41 and a second joint tube 42 rotatably connected at one end portions thereof with respect to each other, a connecting tube 43 enabling communication between the butt-jointed end portions of the first joint tube 41 and the second joint tube 42 rotatably connected with respect to each other, and a conductive assembly 44 respectively located within the first joint tube 41 and the second joint 42 and connected with each other, wherein the connecting tube 43 is a corrugated flexible tube.

In the present embodiment, two dust suction tubes are employed, the first joint tube 41 is rotatably disposed on the second joint tube 42 via rotating shafts a disposed at two sides, and the other end portions of the first joint tube 41 and the second joint tube 42 may be locked with respect to each other.

A rotation angel between the first joint tube 41 and the second joint tube 42 is 0-90°. At this time, the vacuum cleaner stands in a right-angle position, and it can be releases to without holding directly when an emergency event occurs, which is very convenient.

Further, in order to facilitate a stable upright placement, the first joint tube 41 and the second joint tube both 42 are provided with a first position-limiting part b and a second position-limiting part c, respectively, two first position-limiting parts b tightly contact by pushing against each other when the angle between the first joint tube 41 and the second joint tube 42 is 0°; and two second position-limiting parts c tightly contact by pushing against each other when the angle between the first joint tube 41 and the second joint tube 42 is 90°.

In the present embodiment, two sides of the second joint tube 42 are respectively provided with axles d vertically extending to an extension direction of the second joint tube 42, and the swivel joint 4 further comprises rolling wheels 45 rotatably disposed on the axles d around axle lines of the axles d, wherein lower portions of the rolling wheels 45 protrude from a bottom of the second joint tube 42, so as to provide the swivel joint 4 in a rolling manner.

Further, the rolling wheels 45 extend outwards from a side close to the second joint tube 42, and are in a circular truncated cone with a gradually reduced external diameter. The volume is reduced maximally, and the overall appearance is also beautified.

The conductive assembly 44 comprise a first conductive interface 441 and a second conductive interface 442 respectively disposed within the first joint tube 41 and the second joint tube 42, and a conducting wire 443 connected the first conductive interface 441 with the second conductive interface 442.

In the present embodiment, the first conductive interface 441 and the second conductive interface 442 are a contact pin and a socket cooperating with each other, respectively.

The conducting wire 443 is disposed inside the corrugated flexible tube along corrugation of the corrugated flexible tube, and is integrally formed with the corrugated flexible tube. Specifically, two end portions of the conducting wire 443 are connected with the contact pin and the socket, respectively.

Above all, the present embodiment has the following advantages:

1) The vacuum cleaner can stand rapidly and uprightly, and it can be released to without holding directly when an emergency event occurs, which is very convenient;

2) It allows an operator to perform multi-angle (omni-directional) dust removal with a natural posture (no need to squat or grovel), with much convenience and low cleaning strength; and meanwhile, the dust suction tube can be configured telescopically, and is convenient for the dust suction head to deep into the area to be cleaned, bringing a convenient and fast cleaning work;

3) Through the design of the rolling wheels, the dust suction tube can be rolled on the ground, thereby effectively assisting the cleaning, and also preventing the scratch of the floor and the dust suction tube;

4) Through the design of the plug-in conductive assemblies, and the integrated arrangement of the conducting wire and the corrugated flexible tube, the circuit of the vacuum cleaner can be connected, and is much concealed, and the line fault is not easy to occur.

The above detailed describes the present disclosure, and is intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

What is claimed is:

1. A swivel joint for a hand-held vacuum cleaner, comprising a first joint tube and a second joint tube for connecting a vacuum cleaner body of a vacuum cleaner with a dust suction tube or connecting a dust suction tube with a dust suction head or connecting two dust suction tubes, a connecting tube enabling communication between the first joint tube with the second joint tube, and a conductive assembly, wherein one end portion of the first joint tube and one end portion of the second joint tube are rotatably connected with respect to each other, the connecting tube is a corrugated flexible tube, and the conductive assembly comprise a first conductive interface disposed on the first joint tube, a second conductive interface disposed on the second joint tube, and a conducting wire disposed inside the corrugated flexible tube, wherein two ends of the conducting wire connect with the first conductive interface and the second conductive interface, respectively;

wherein the first joint tube is rotatably connected to the second joint tube via a rotating shaft, a center line of the first joint tube and a center line of the second joint tube form an angle of 0-90°.

2. The swivel joint for the hand-held vacuum cleaner according to claim 1, wherein, the first joint tube and the second joint tube both are provided with a first position-limiting part and a second position-limiting part, respectively, the angle is 0° when two first position-limiting parts contact; and, the angle is 90° when two second position-limiting parts contact.

3. The swivel joint for the hand-held vacuum cleaner according to claim 1, wherein, the swivel joint further comprises a rolling wheel rotatably disposed on the second joint tube via an axle, an axle line of the axle is perpendicular to a center line of the second joint tube, and a lower portion of the rolling wheel is lower than a bottom of the second joint tube to touch a ground.

4. The swivel joint for the hand-held vacuum cleaner according to claim 3, wherein, two sides of the second joint tube are respectively provided with the rolling wheels.

5. The swivel joint for the hand-held vacuum cleaner according to claim 3, wherein, an outer diameter of the rolling wheel gradually decreases in a direction away from the second joint tube.

6. The swivel joint for the hand-held vacuum cleaner according to claim 1, wherein, the other end portions of the first joint tube and the second joint tube are capable of being locked with respect to each other.

7. The swivel joint for the hand-held vacuum cleaner according to claim 1, wherein, the first conductive interface and the second conductive interface are contact pins or sockets.

8. The swivel joint for the hand-held vacuum cleaner according to claim 1, wherein, the conducting wire and the corrugated flexible tube are integrally formed.

9. The swivel joint for the hand-held vacuum cleaner according to claim 1, wherein, the conducting wire is disposed inside the corrugated flexible tube along corrugation of the corrugated flexible tube.

10. A hand-held vacuum cleaner, comprising a vacuum cleaner body, a dust suction tube and a dust suction head, wherein, the hand-held vacuum cleaner further comprises the swivel joint according to claim 1.

11. The hand-held vacuum cleaner according to claim 10, wherein, there is one dust suction tube, the vacuum cleaner body and the dust suction tube are connected via one swivel joint, and the dust suction tube and the dust suction head are connected via another swivel joint.

12. The hand-held vacuum cleaner according to claim 10, wherein, there are two dust suction tubes, the two dust suction tubes are connected via one swivel joint, and one of the dust suction tubes and the dust suction head are connected via another swivel joint.

* * * * *